Patented June 20, 1944

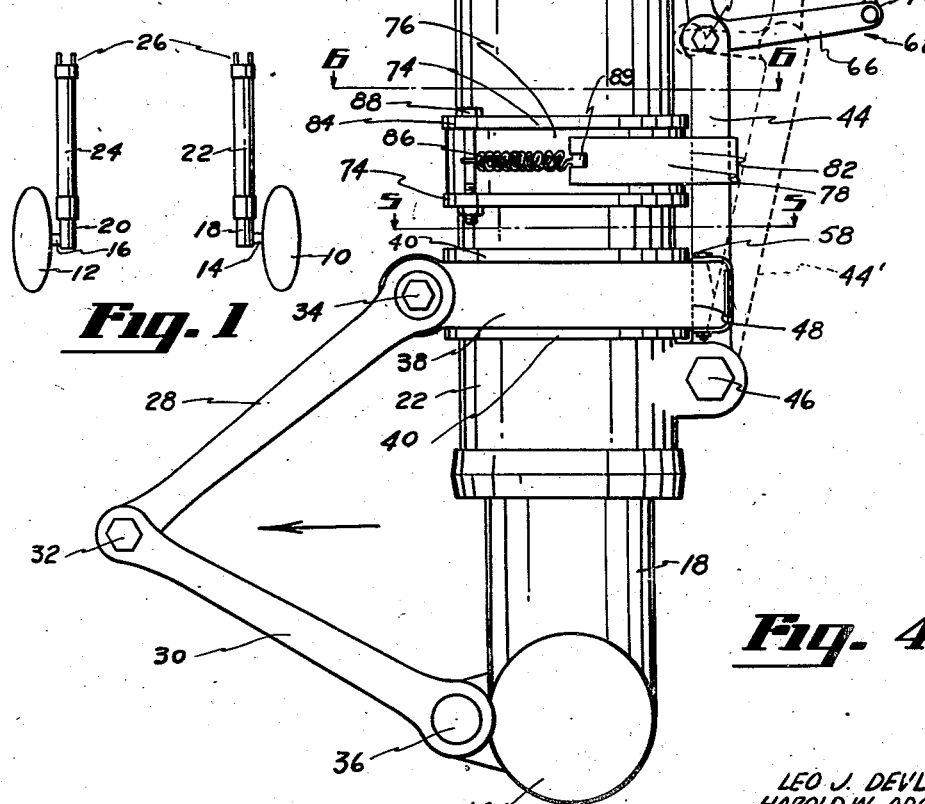

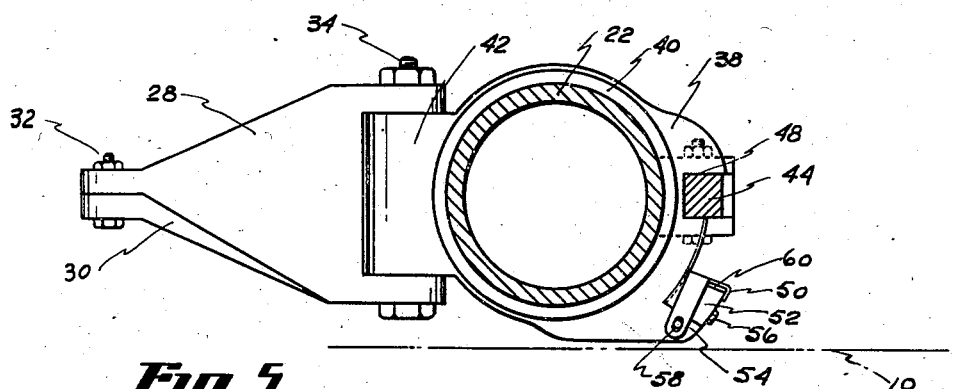
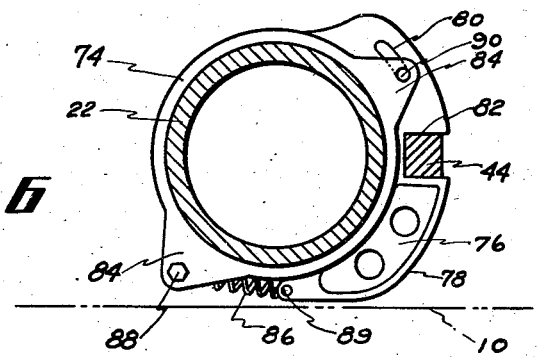
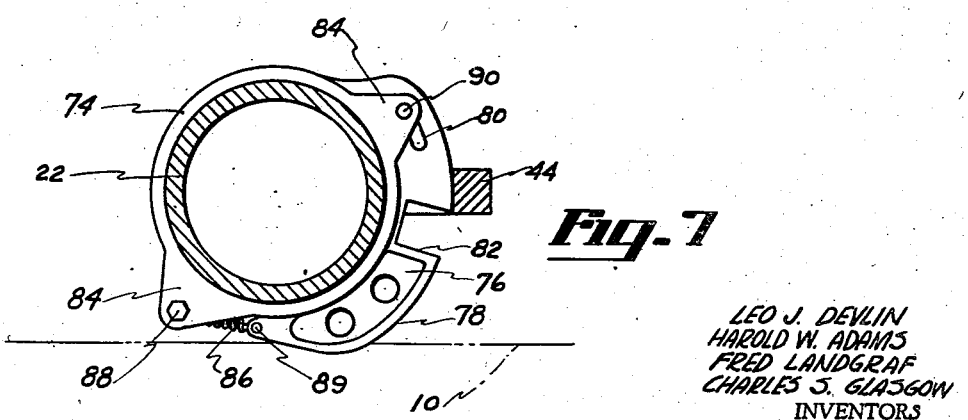

2,351,935

UNITED STATES PATENT OFFICE 2,351,935

EMERGENCY BRAKING DEVICE

Leo J. Devlin, Los Angeles, Harold W. Adams, Santa Monica, Fred Landgraf, Los Angeles, and Charles S. Glasgow, West Los Angeles, Calif., assignors to Douglas Aircraft Company, Inc., Santa Monica, Calif.

Application December 21, 1940, Serial No. 371,190

12 Claims. (Cl. 244—103)

Our invention relates to aircraft landing gear with particular reference to a device capable of introducing a braking action for a landing aircraft when the conventional wheel brakes have failed or are relatively ineffective as from, for example, a loss of fluid in an hydraulic brake system, or malfunctioning of some vital part.

The proper functioning of wheel brakes is becoming more and more important as the maximum speed of aircraft increases for the reason that, as is well known, any increase in maximum flight speed is reflected positively in the landing speed or stalling speed. This means that if the aircraft brakes fail, the high speed of the craft may very likely carry it beyond the bounds of the landing field runway, many of which are considered to be of inadequate length at the present time.

A number of airplane types now in use and many more under construction are known to land at near 100 miles per hour speeds and more, consequently, it is readily apparent that even with brakes applied a considerable distance will be required for stopping. It is likewise readily apparent that with faulty brakes or no brakes serious mishap may result.

One step to lessen the possibility of landing accident has taken the form of what is quite commonly known as a tricycle landing gear wherein the main landing gear wheels are disposed aft of the center of gravity and a nose wheel is placed way forward on the centerline of the fuselage nose. This type of landing gear obviates nose-over inasmuch as the forward wheel prevents the nose of the airplane from going down regardless of the landing accuracy or the application of braking forces at the main wheels.

With the old type of airplane having its third point of support at the tail, severe application of brakes, any obstruction confronting the main landing wheels or sudden cessation of the wheel rotation would permit the forward momentum to rotate the entire airplane about the main wheel axes, bringing the nose down and the tail up. Likewise sharp turns at high speed were impossible without disastrous results. However, as previously stated, the nose wheel equipped airplane has changed all this and has opened the way for new speed arresting devices.

Our invention is primarily for use on the main wheels of a tricycle type airplane although we do not wish to be limited to such a type of craft for the reason that even on the tail wheel type our invention would find useful application in emergency. Nose over tendency to some extent could be counteracted by extreme up elevator possibly making such a course of action a lesser evil than overrunning a landing runway, going into a ditch or some other more serious hazard.

As has been said, the invention is intended as a substitute for brakes and is for use only when the regular brakes fail or become relatively ineffective. Consequently, we are concerned with stopping the rotation of the main wheels when they are in contact with a landing surface and we do so by skewing the main wheels into a non-parallel relationship out of their normal plane of rotation whereupon a skidding or scrubbing action is set up between the tires and the landing surface. It is true that such a method of stopping the craft necessitates abnormal and perhaps destructive tire wear but it must be remembered that it is strictly an emergency measure in which case the cost of the tires is only a fraction of that which might accrue from a serious accident.

Accordingly, it is the principal object of our invention to provide an emergency braking expediency for use in aircraft landings when the conventional brakes have failed or become ineffective.

It is another object of our invention to bring a landing aircraft to a stop quickly upon a landing surface by skewing one or more of the landing wheels out of its normal plane or rotation.

Another object is to cause the landing wheels of an aircraft to assume a non-parallel relationship to the normal direction of motion of the craft.

Another object is to cause one or more of the landing wheels of an aircraft to assume a non-parallel relationship with respect to another landing wheel of the craft.

A still further object of our invention is to provide a mechanism by which the normal rotative force of the landing wheel is utilized to swing the wheel away from its normal attitude.

Another object lies in the provision of a mechanism automatically operable upon release to frictionally engage the tire of an aircraft landing wheel and cause the tire and wheel, by reason of their rotative force, to travel in an arc about a substantially vertical wheel support.

Other and further objects and advantages will become apparent after a reading of the following description and a study of the drawings in which:

Figure 1 is a front elevation of a main landing gear of an aircraft in which vertically extending struts support laterally extending, wheel carrying axles.

Figure 2 is a plan view of the landing gear of Figure 1 and showing landing wheels normally disposed for rotation in a plane parallel to the normal direction of motion of the aircraft as indicated by the arrow, Figure 3 is a plan view of the landing gear of Figure 2 and showing each landing wheel skewed outwardly approximately 20 degrees from its Figure 2 position.

Figure 4 is a side elevation of one of the vertically extending landing gear struts looking from the wheel side thereof and showing a portion of the wheel's periphery in phantom. A release mechanism for skewing the wheel is shown in detail, and an arrow corresponding to the arrows of Figures 2 and 3 indicates the forward direction of motion;

Figure 5 is a view taken along the line 5—5 of Figure 4 showing a releasable rotating strut collar and a phantom line indicating the clearance between the collar and the landing wheel.

Figure 6 is a view taken along the line 6—6 of Figure 4 showing a releasable limited rotating strut collar and a phantom line indicating the clearance between the collar and the landing wheel when both are in their normal position; and Figure 7 is a view similar to Figure 6 but showing the collar rotated clockwise to a limited extent in which position it frictionally engages the landing wheel tire, the latter being indicated in part by a phantom line.

For purposes of illustration we have shown our invention as applied to an airplane landing gear wherein the two landing wheels 10 and 12 are mounted for rotation upon horizontally disposed axles 14 and 16. Each axle is in turn secured, at its inner end, to a piston 18 or 20 which is reciprocable and rotatable in a cylinder 22 or 24. The piston and cylinder assembly comprises a device for softening and absorbing landing impact so that the shock is not transmitted directly to the airplane structure itself. The upper end of each cylinder is provided with a pair of ears 26 affording attachment to the airplane's wing or fuselage structure (not shown).

When a single wheel is mounted on an axle at the side of a supporting strut as shown in Figure 1 it is evident that forward momentum of the airplane would cause the wheel and axle to swing in an arc about the longitudinal axis of the strut as soon as the wheel makes frictional contact with a landing surface. This is, of course, extremely undesirable under normal operating conditions and for that reason several devices for preventing such a reaction are in common use today. Perhaps one of the most widely used is the "scissor-link" arrangement which we have shown in Figure 4. Here, a pair of links 28 and 30 are connected in pivotal relation at 32. The free end of link 28 is then pivotally connected at 34 to the landing gear strut cylinder 22, for example, and the free end of link 30 is pivotally connected at 36 to the piston 18 near the axle 14. In this way no interference is offered to the free longitudinal reciprocation of the piston in the cylinder while relative rotation is positively prevented, all turning forces imposed upon the piston through the wheel and axle being resisted by the links 28 and 30.

In adapting this "scissor-link" arrangement to our invention we have placed a rotatable collar 38 around the cylinder 22 in the normal plane of attachment of the link 28 thereto and then, instead of attaching directly to the cylinder, the link is connected to the rotatable collar. The collar is shown in detail in Figure 5 as is the link 28 and its attachment. A bearing surface upon which the collar rides is formed between two flanges 40 integral with the cylinder 22. At one point on the collar's rim a protruding portion 42 is fixed to accommodate the link 28 and at another point, diametrically opposite the portion 42, the collar is flared out to accommodate a notched arrangement.

At this point it may be seen that the piston restraining effect of the "scissor-links" has been obviated by its attachment to the rotatable collar. Therefore, in order to restore the restraining function of the "scissor-links" a means has been provided to lock the collar 38 against rotation. One way of doing this is with a notch and lever as shown in the drawings. A lever 44 is pivoted to the cylinder at a point 46 below the collar 38 and is adapted, when placed in a position parallel to the strut to engage a deep notch 48 in the flared out portion of the collar. Consequently, it is apparent that the lever serves to lock the collar against rotation when the lever 44 is nested in the notch. Looking at Figure 5, it may be seen that the notch is of much greater depth on the high side than on the low side. The purpose of this variation is to provide a second notch of greater width adjacent the first notch and in which the lever 44 will ride as soon as it is disengaged from notch 48. As opposed to the function of notch 48 in positively preventing rotation of the collar 38, the second notch functions to limit the rotation of the collar to a desired degree.

As shown, an adjustable stop member 50 has been placed to form the lower termination of the wider notch and the placing of this member is such that a 20 degree rotation of the collar is permitted. If a greater or lesser degree of rotation is desired, blocks of varying size similar to a block 52 may be placed between the member 50 and another integral portion 54 of the collar 38. The block 52 is held in place as by a stud 56 and the stop member 50 is held in place as by a bolt 58. An elastic pad 60 may be placed between the stop member 50 and the block 52 to soften the impact of the lever 44 striking against the stop at the end of the 20 degree collar rotation. The wide notch has been shown of a size permitting a maximum collar rotation of 30 degrees, however, this may readily be increased to 90 degrees if desired through a slight modification in the collar design.

In order that the lever 44 may be pivoted outward from its position parallel to the cylinder to a position indicated by the dotted lines 44' wherein it is disengaged from the deep notch 48, an operating mechanism has been attached to the upper end of the lever. This mechanism includes a bellcrank 62 pivoted at 64 to the lever 44. One arm 66 of the bellcrank extends to the right and is connected to an operating cable 68 or the like at a point 70. This cable may extend to a control compartment of the airplane in order that the lever 44 may be actuated therefrom when it is desired to release the collar 38. The other arm 71 of the bellcrank 62 serves as a leverage arm for forcing the upper end of the lever 44 to the right and away from the cylinder 22 into the dotted line position 44'. A roller 72 is mounted at the end of the arm 71 and is in rolling engagement with the cylinder wall. Thus when tension is placed in the cable 68 by an operator, the bellcrank 62 is rotated in a counterclockwise direction about its pivot point 64 causing the roller 72 to travel downward on the cylinder wall and force the lever 44 to the right. The lever releasing position of the bellcrank 62 is indicated by the dotted lines 62'. It will be noted in Figure 4 that the bottom of the wide notch, with which the lever 44 is in engagement when in the dotted line position, is bevelled to a degree corresponding to the angular displacement of the lever 44.

The collar 38 and the lever 44 together with the latter's actuating mechanism constitute the important parts in the locking and releasing of the "scissor-links" for controlling the skewing of the wheel 10, a portion of the periphery of which is indicated by a phantom line in Figure 4. In addition to these parts, however, an additional device has been provided to assist the frictional forces transmitted to the wheel by its contact with the landing surface.

This additional device comprises a spring loaded collar arrangement shown in Figures 4, 6, and 7, and disposed above the collar 38 on the cylinder 22. A pair of flanges 74 formed integral with the cylinder 22 serve as a track for a cam-shaped collar 76 which is provided with a cam-like surface 78, a slot 80, and a notch 82 similar to the notch 48 in collar 38. A pair of ear-like extensions 84 on substantially opposite sides of the flanges 74 are provided to assist and control rotation of the collar 76. One pair of ears serves as an attachment for a spring 86 which is secured to a bolt 88, interconnecting the ear-like extensions, and to the collar 76 at 89. The spring 86 is in tension, exerting a force to rotate the collar in a clockwise direction.

The other pair of ear-like extensions 84 are also interconnected by a bolt 90 or pin and this bolt is adapted to ride in the slot 80 of the collar as the collar is rotated. The purpose of the bolt 90 is to limit the rotation of the collar in the amount permitted by the length of the slot.

As previously stated, the collar 76 is provided with the notch 82 similar to the notch 48 in the collar 38. Likewise, this notch 82 is for the purpose of receiving the lever 44 as indicated in cross section in Figure 6. The principal purpose of the collar 76 is to insure the skewing of the wheel by moving into frictional engagement with the side thereof. As the lever 44 is moved out of the deep notch 48 of the collar 38 it is likewise moved out of notch 82 of collar 76. As soon as the collar is released the tension spring 86 rotates the collar clockwise until the upper end of the slot 80 stops the rotation by engaging the bolt 90. The collar will have moved to the position shown in Figure 7 and the cam-like surface 78 will have engaged the side of the wheel 10 off center at a point in advance of a transverse vertical plane through the axis of rotation, as indicated in both Figures 6 and 7 by a phantom line. The wheel will then be forced by its own rotation or by its off center engagement with cam-like surface 78 to swing back into a skewed position.

While the operation of our emergency braking device is quite obvious from the foregoing description, it may be well to assume an entire sequence of operation from the time the pilot of an airplane approaches a landing surface. We may further assume that the airplane is equipped with hydraulic pressure operated brakes. If something has developed to cause a loss of hydraulic pressure or fluid it is obvious that the brakes will thus be rendered inoperative. Under some conditions the pilot will not become aware of this until he attempts to apply the brakes after coming in contact with the landing surface. Under other conditions, he may be aware of his lack of brakes before landing. For example, if the airplane is also equipped with hydraulically operated wing flaps, as most modern craft are for the purpose of decreasing the landing speed and increasing the gliding angle, the pilot's first indication of loss of pressure will come long before the actual landing contact inasmuch as the wing flaps will fail to respond. In such an instance the importance of our emergency braking device will be infinitely increased inasmuch as the pilot will not be able to avail himself of the air braking action of the flaps thus resulting in a higher than usual landing velocity.

In the first case, immediately upon useless application of the wheel brakes after landing contact, the pilot may release the wheels to the skewed position. In the second case, the pilot will be aware of the need for skewing the wheels and will release the collars 38 and 76 either before or as soon as the landing roll has begun.

Once the lever 44 has left the deep notch 48 in collar 38 the collar, "scissor-links," piston and wheel will begin to turn both by reason of the forward momentum of the airplane upon the landing surface, and of the off center engagement of cam 78 with the wheel. The wheel will continue to skew until the stop member 50 impacts the lever 44, positively halting the skewing action.

Under certain conditions friction and loads imposed in other parts of the landing gear assembly may tend to resist the skewing tendency in which case the upper collar 76 is found to be useful in furthering the skewing action. It is designed to be released from the locking influence of the lever 44 simultaneously with the disengagement of that lever from the deep notch in the lower collar. As soon as release is accomplished, the spring 86 brings the cam surface 78 into engagement with the rapidly rotating wheel (presumably the tire thereof) at a point in advance of the transverse vertical plane through its axis of rotation whereupon the frictional engagement and the wheel's rotative force will assist the naturally resulting force above referred to in skewing the wheel.

Once the wheels are skewed outward into a position non-parallel to the landing direction of motion of the airplane a severe skidding action will occur to bring the airplane to a stop. If only one wheel is skewed the skidding action will cause the airplane to execute a turn toward the skewed wheel, thus accomplishing the emergency braking without serious results.

It is expected and acknowledged that the tires will be damaged by such a severe skidding action but such damage is of no importance under an emergency.

We have herein shown and described our invention in one embodiment but it will be apparent after a study of the description and drawings that various modifications and changes may be made in accomplishing the desired results. Accordingly, it is not wished to be bound other than by the limits of the following claims.

We claim:

1. In an aircraft emergency braking device adapted for use when the aircraft contacts a landing surface, a pair of supporting struts fixed to the aircraft and extending downward toward the landing surface, landing wheels disposed to roll in a direction parallel to the normal direction of motion of the aircraft and carried by the lower extremities of said struts, lever means for locking said wheels in their parallel relationship during normal operation of the aircraft, quick release mechanism operable by the aircraft pilot to move said lever means to an unlocked position whereby said wheels are free to swing to a position in which their relationship to the direction of motion of the aircraft is non-parallel, and means simultaneously released by said lever means and operating in conjunction with the forward motion of said aircraft to force said wheels to swing.

2. In an aircraft emergency braking device adapted for use when the aircraft contacts a landing surface, a pair of substantially vertical supporting struts, an axle carried by each strut near the lower extremity thereof and extending outwardly therefrom in a direction transverse to the normal direction of motion of the aircraft, a wheel carried by each axle locking means for holding said axles in their transverse relationship, a quick release mechanism operable to render said locking means ineffective whereby said axles may swing in an arc about the axis of said supporting struts, and spring loaded means brought into engagement with the wheels to force said axles to swing.

3. In an aircraft emergency braking device adapted for use when the aircraft contacts a landing surface, a pair of substantially vertical supporting struts, an axle carried by each strut near the lower extremity thereof and extending outwardly therefrom in a direction transverse to the normal direction of motion of the aircraft, wheels rotatable on the axles to carry the aircraft freely along the landing surface, said wheels being parallel to each other when the axles are in their above described position, locking means for holding said axles in said position, means for quickly releasing said locking means whereby one axle will be swung clockwise and the other counterclockwise by the frictional forces set up between said wheels and said landing surface by the forward movement of said aircraft, and means simultaneously released to assist said frictional forces to swing said axles in the manner set forth.

4. In an aircraft emergency braking device adapted for use when the aircraft contacts a landing surface, at least one supporting strut fixed to the aircraft and extending downward toward the landing surface, an axle extending laterally from said strut and swingable freely about the strut axis, a wheel rotatable on the axle to carry the aircraft freely along the landing surface, means for holding said axle in a fixed position wherein its longitudinal centerline is transverse to the normal direction of motion of the aircraft, and a quickly operable assembly for rendering said first named means ineffective and frictionally engaging said wheel, whereby the rotation of said wheel will cause said wheel to move from a freely rotating position to a substantially sideward skidding position, said axle pivoting about the axis of its supporting strut.

5. A method of effecting an emergency braking effect upon an aircraft comprising the steps of holding the landing wheels thereof in a position in which their plane of rotation lies in the direction of movement of the aircraft, bringing the wheels into contact with a landing surface, bringing a part of said aircraft into frictional engagement with one of said wheels and causing said wheel to skew itself outward through its rotation with respect to said part.

6. In an aircraft emergency braking device adapted for use when the aircraft is in moving contact with a landing surface, a pair of supporting struts fixed to the aircraft and extending downward toward the landing surface, landing wheels disposed to roll in a direction parallel to the normal direction of motion of the aircraft and carried by the lower extremities of said struts, link means for holding each of said wheels in its parallel relationship during normal operation of the aircraft, a notched collar rotatable on each of said struts and serving as an attachment for said link means, a lever pivotally connected to each of said struts and adapted to engage said notched collar to prevent rotation thereof, means operable to withdraw said lever from said collar locking position so that said wheels are free to move out of parallel with respect to the direction of motion of the aircraft, and a friction device for forcing said wheels out of parallel for braking the forward motion of the aircraft.

7. In an aircraft emergency braking device adapted for use when the aircraft is in moving contact with a landing surface, a supporting strut fixed to the aircraft and extending downward, a landing wheel carried by the strut and disposed to roll in a direction substantially parallel to the normal direction of motion of the aircraft, link means for holding said wheel in its parallel relationship during normal operation of the aircraft, a collar rotatable on said strut and serving as an attachment for said link means, means forming a first notch in said collar, adjustable means forming a second notch in said collar including said first notch, means carried by said strut and adapted to engage said first notch to entirely prevent rotation of said collar, and to engage said second notch to limit rotation of said collar, and means rotatable simultaneously with said collar to frictionally engage said rolling wheel whereby said wheel will cause said collar to rotate to the extent permitted by said second notch.

8. In an aircraft emergency braking device adapted for use when the aircraft is in moving contact with a landing surface, a supporting strut fixed to the aircraft and extending toward said landing surface, a landing wheel carried by the strut and disposed to roll in a direction substantially parallel to the normal direction of motion of the aircraft, link means for holding said wheel in its parallel relationship during normal operation of the aircraft, means rotatable on said strut and serving as an attachment for said link means, means adapted to engage one portion of said rotatable means to entirely prevent rotation thereof and to engage another portion of said rotatable means to limit rotation after the first portion has been disengaged, and spring loaded means released for movement simultaneously with the disengagement of said last named means with said first portion of said rotatable means, said spring loaded means engaging said rolling wheel to cause said rotatable means to rotate.

9. In an aircraft emergency braking device adapted for use when the aircraft is in contact with a landing surface, a supporting strut fixed to the aircraft and extending toward said landing surface, a landing wheel carried by the strut and disposed to roll in a direction substantially parallel to the normal direction of motion of the aircraft, means for holding said wheel in its parallel relationship, means for rendering said last named means ineffective so that said wheel is free to swing out of its parallel relationship, and means releasable to engage said wheel whereby rotation of the latter in contact with the last named means will force the wheel to travel with respect thereto.

10. In an aircraft emergency braking device adapted for use when the aircraft is in contact with a landing surface, a supporting strut fixed to the aircraft and extending toward said landing surface, a landing wheel carried by the strut and disposed to roll in a direction substantially parallel to the normal direction of motion of the aircraft, means for holding said wheel in its parallel relationship, means for rendering said last named means ineffective so that said wheel is free to swing out of its parallel relationship, a cam shaped collar capable of limited rotation on said strut, said collar resting normally in a position out of engagement with said wheel, and means to rotate said collar to bring a portion thereof into engagement with said wheel whereby rotation of the latter by reason of its contact with the collar will force the wheel to travel with respect thereto.

11. In an aircraft landing gear including a cylinder, a piston, an axle, and a rotating wheel, said piston carrying said axle and wheel and being capable of rotation in said cylinder; means carried by said cylinder in a position normally out of engagement with said wheel, and means for bringing said first named means into frictional engagement with said wheel to cause said wheel, axle, and piston to swing with respect to said cylinder and wheel engaging means.

12. In an aircraft landing wheel normally locked in a given rotating position parallel to the direction of flight, means for unlocking said wheel so that it may move from said given position at an acute angle to said direction, and means moving into engagement with said wheel when said wheel is unlocked to cause said wheel to move to another position with respect to said last named means.

LEO J. DEVLIN.
FRED LANDGRAF.
HAROLD W. ADAMS.
CHARLES S. GLASGOW.